Sept. 12, 1933.  D. D. TIBBS  1,926,413
CHOKER
Filed Sept. 25, 1931
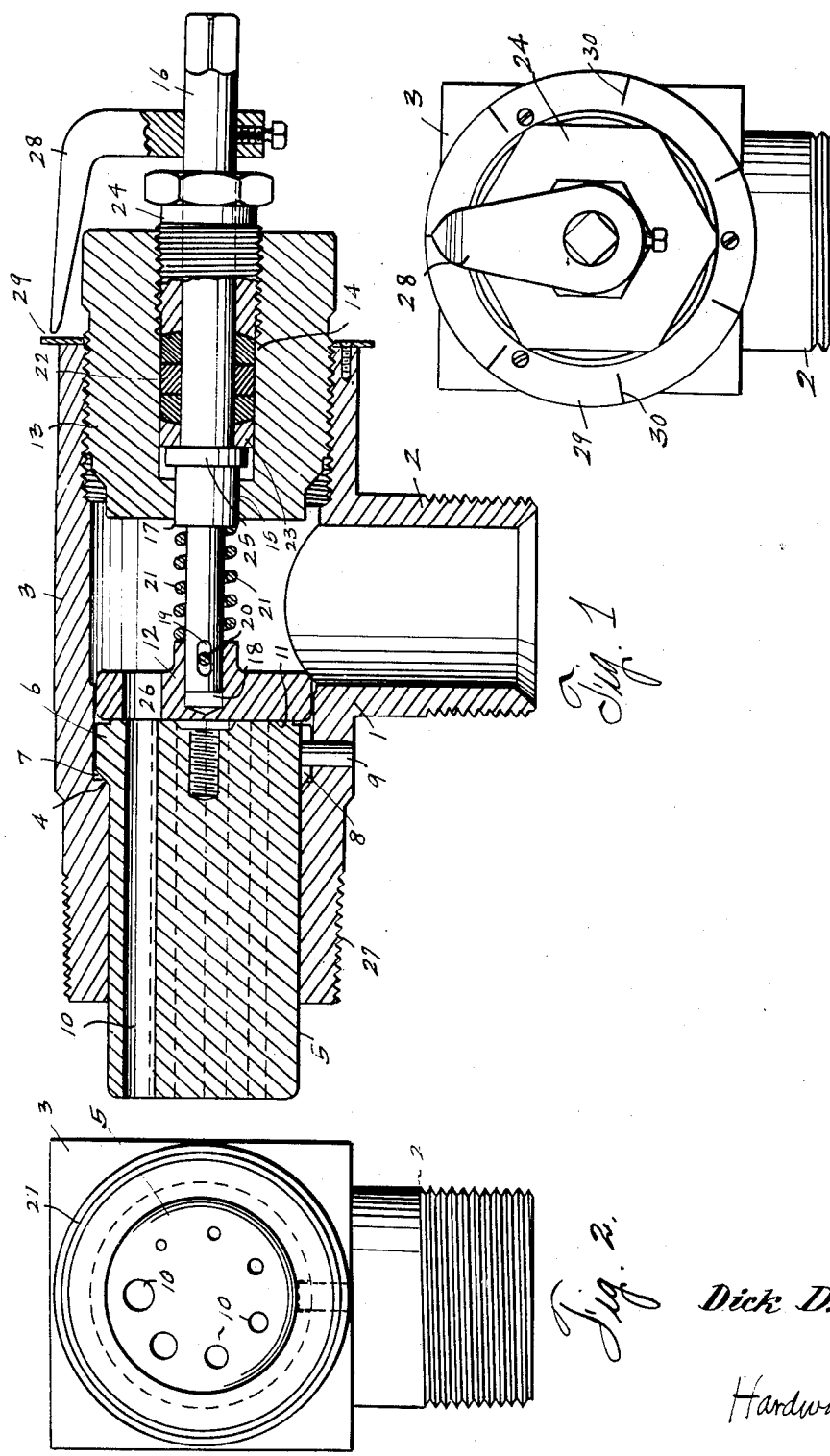
Inventor
Dick D. Tibbs
Hardway & Cathey
Attorneys.

Patented Sept. 12, 1933

1,926,413

UNITED STATES PATENT OFFICE 1,926,413

CHOKER

Dick D. Tibbs, Fort Worth, Tex.

Application September 25, 1931
Serial No. 565,137

1 Claim. (Cl. 251—86)

This invention relates to a choker.

An object of the invention is to provide a choker of the character described designed to be connected into a fluid conducting line, for the purpose of controlling the flow of fluid therethrough.

Another object of the invention is to provide a choker of the character described that is readily adjustable so as to vary the capacity thereof to the end that the quantity of fluid flowing through the line may be correspondingly regulated.

The choker has been specially designed for use on flow lines from oil wells from which the oil flows under pressure and where it is desirable that the quantity of oil flowing from the well be restricted and controlled.

With the above and other objects in view the invention has particular relation to certain novel features of construction, operation and arrangement of parts, an example of which is given in this specification and illustrated in the accompanying drawing, wherein:

Figure 1 shows a longitudinal sectional view of the choker, and

Figures 2 and 3 show end views taken from opposite ends of the choker.

In the drawing, the numeral 1 designates a T connection having the tubular nipple 2 to which the outflow line leading from an oil well or other source of pressure may be connected. The body 3 is tubular in form and at one end is provided with an inside outwardly tapering seat 4. A flow bean 5 is fitted into said end and the inner end of said bean is enlarged forming the head 6 having the outwardly tapering annular face 7 which fits closely against said seat 4 and also has a notch 8 in which the inner end of the pin 9 engages. Said pin is fitted through the body 3 and holds the bean against turning. The flow bean 5 has a plurality of longitudinal flow-ways 10 therethrough. The inner end of the bean 5 is formed with a flat smooth end face 11 against which the disc-like valve 12 fits.

Screwed into the other end of the body 3 there is a plug 13 having the deep axial socket 14 in its outer end and the inner end of this socket is reduced forming a bearing 15. There is a valve stem 16 which works through the bearing 15 and whose inner end is reduced forming the annular shoulder 17 thereon. The reduced end of said stem works in a socket 18 in the valve 12 and has a lengthwise slot 19 therethrough to receive the anchor pin 20 whose ends are anchored to said valve. Surrounding the reduced end of the valve stem and interposed between said valve and the shoulder 17 there is a strong coil spring 21.

Surrounding the stem 16 and located within the socket 14 there is the packing 22 which is confined between the junk ring 23 on one side and the gland nut 24, threaded into the outer end of the socket 14, on the other side. The junk ring 23 abuts the annular abutment 25 on the stem 16. The gland nut 24 may be screwed up to give the desired compression to the packing 22 and this will place the spring 21 under compression which will operate, through the stem 16, to maintain the desired compression on the packing and will also operate to hold the valve 12 firmly seated against the opposing face 11. By turning the stem 16, the valve 12 may be correspondingly turned and this valve has an opening 26 which may be brought into registration with a selected flowway 10. The gritty substances in the oil will cut out and enlarge said flow way when the oil is flowing under pressure and in such case, when it is desired to further restrict the flow of oil, the valve 12 may be turned into alignment with a flow way of less capacity and the volume of oil flowing from the well may thus be regulated at will.

It is to be understood that a delivery line may be connected onto the threaded end 27 of the body 3 through which the flowing fluid may be conducted to the desired location.

There is a finger, or pointer, 28, secured to the outer end of the stem 16 and whose inner end is adjacent the annular gauge plate 29 secured to the corresponding end of the body 3. This plate 29 has the markings 30 arranged to correspond with the corresponding flow ways 10 and the position of the finger 29 will thus indicate the flow way aligned with the valve opening 26.

The drawing and description disclose what is now considered to be a preferred form of the invention by way of illustration only while the broad principle of the invention will be defined by the appended claim.

What I claim is:

A choker comprising a tubular body having one end reduced forming an inside annular seat, a flow bean fitted into said reduced end and having its inner end enlarged and provided with an annular face adapted to closely fit against said seat means to prevent the bean from turning relative to said body, said flow bean having a plurality of longitudinal flow ways therethrough and the inner end of the bean being formed with a flat end face forming a valve seat, a plug screwed into the large end of said body having a deep axial socket in its outer end, the inner end of said socket being reduced forming a bearing, a valve stem working through said bearing whose inner end is provided with a stop, a valve fitted against said valve seat and having a loose connection with the stem, a spring between said valve and stop, packing in said socket around said stem, means for retaining said packing in place, said valve being provided with an opening and being turnable, through said stem, whereby said opening may be brought into registration with a selected flow way.

DICK D. TIBBS.